Patented Nov. 28, 1944

2,363,676

UNITED STATES PATENT OFFICE 2,363,676

PROCESS FOR PURIFYING METHYL STYRENE

Claude W. Jordan, Paoli, Pa., assignor to The United Gas Improvement Company, a corporation of Pennsylvania No Drawing. Application February 14, 1942, Serial No. 430,886

14 Claims. (Cl. 260—669)

This invention pertains generally to the purification of methyl styrene, and pertains particularly to the purification of methyl styrene obtained from light oil.

More specifically, this invention pertains to the purification of methyl styrene by the application of metals in group IA and group IIA of the periodic table, or alloys thereof.

It is an object of the present invention to purify methyl styrene by the use of one or more alkali or alkaline earth metals under carefully controlled conditions. Another object of the invention is the provision of certain methods whereby methyl styrene may be purified by the application of one or more alkali or alkaline earth metals without undue loss of methyl styrene in the form of methyl styrene polymers of low quality.

Other objects of the invention will be apparent to those skilled in the art from an inspection of the following description and claims.

In the various processes for the manufacture of combustible gas such as oil gas, carburetted water gas, or coal gas, considerable quantities of tar are produced, and the gas contains substantial quantities of readily condensible materials.

These condensates, including the light oil obtained upon distillation of the tar, are sources for many hydrocarbons. In particular, they are sources of methyl styrene.

With ordinary methods of fractional distillation as now practiced, it is impossible to separate many of these unsaturated compounds in a substantially pure state because of the presence of other materials which apparently are either of similar boiling point or are capable of forming azeotropic mixtures with the desired hydrocarbon. This is especially true in the case of methyl styrene, in which the usual polymerizing difficulties are increased by the pronounced tendency of the material to polymerize during the fractionation process. For example, a typical methyl styrene fraction obtained by ordinary distillation processes will contain hardly more than 50% or 60% methyl styrene.

This has led to the development of auxiliary methods for increasing the concentration of light oil methyl styrene fractions to the desired extent.

Methyl styrene fractions obtained by the fractionation of light oil according to the usual methods employed in the art, as well as those of lower and higher concentration obtained, for example, by the use of more drastic fractionating methods and/or the use of certain special concentrating methods, are generally suited for the manufacture of synthetic resins by suitable polymerization methods, except that the resulting resins are very often too inferior with respect to color, color stability, electrical resistance, molding properties, freedom from crazing, thermal stability, melting point, specific viscosity, molecular weight, and mechanical strength as to be of any considerable value.

I find that these deficiencies are generally traceable to the presence of certain contaminating materials in the methyl styrene fractions during the polymerizing process.

While I have not as yet exactly determined the character of all of these impurities, experimental evidence indicates that they may be classified in certain specific groups.

For example, a typical methyl styrene fraction obtained from light oil was analyzed and found to contain appreciable quantities of sulfur. This indicates that crude methyl styrene obtained from the above sources contains a relatively large quantity of sulfur-containing materials, such as mercaptans, disulfides, and/or derivatives of thiophene and related compounds.

Another portion was treated with a mercurating solution which resulted in the production of a copious precipitate. Precipitates obtained from different portions of the starting material varied in color from a faint yellow to a light brown. This indicates, among other things, the presence of substituted thiophene and thiophene homologues.

The treatment of various light oil fractions with ammoniacal cuprous chloride resulted in the formation of a heavy yellow precipitate. This indicates the presence of acetylenic compounds, such as methyl phenyl acetylene. Further work resulted in the isolation of substantial quantities of methyl phenyl acetylene from several light oil methyl styrene fractions, indicating that this material, as well as other substituted acetylenes, is a principal impurity of light oil methyl styrene. Similar tests made with pure methyl styrene diluted with xylene to the same concentration as the crude methyl styrene fractions treated above gave results which were negative in each case.

Indene also is an important impurity of light oil methyl styrene fractions, and imparts particularly undesirable properties to the polymers derived therefrom.

Other types of impurities are doubtless present also. Among these types of impurities may be included oxygenated compounds, such as organic peroxides, organic per acids, and aldehydes; and other reactive classes of compounds.

An important class of compounds in light oil methyl styrene fractions, from the standpoint of their influence upon the properties of the polymethyl styrene subsequently obtained from such fractions, are the colored compounds which impart a yellow or yellow-brown color to the said fractions. While I have not as yet determined the actual structure of any of these colored compounds, certain evidence indicates that they mainly comprise unsaturated compounds with conjugated systems of double bonds.

As indicated above, it is difficult, if not impossible, to prepare a commercial grade of polymethylstyrene from crude light oil fractions unless at least some of the contaminating impurities are removed.

While the exact influence of each of these contaminating materials is not known, it may be pointed out that they may act (1) as accelerators, resulting in the production of polymethylstyrene of relatively poor quality under polymerizing conditions which would normally result in the production of a good grade of polymethylstyrene; (2) as inhibitors, reducing the quantity of polymethylstyrene obtained under normal polymerizing conditions, and/or (3) they may take part in the reaction and become an integral part of the resin molecule.

The presence of contaminating impurities in the polymer molecule undoubtedly would weaken it, causing the resin to be less stable to heat and to decompose readily with the formation of undesired color bodies.

The highly reactive nature of the methyl styrene present in light oil fractions of the type disclosed makes it extremely difficult to remove the contaminating impurities.

I have found, however, that by a proper choice of conditions such as temperature, time of contact, method of application, and so forth, the undesired contaminating materials mentioned, including color and color-forming compounds, may be removed without a considerable loss of the desired hydrocarbon. This is accomplished by the application of one or more metals in groups IA and IIA of the periodic table, or alloys thereof, in finely divided form which term as used herein is intended to include solutions or dispersions in suitable solvents or vehicles.

These results are entirely unexpected, as the metals in these groups, which include lithium, sodium, potassium, rubidium, caesium, barium, strontium, and calcium, have long been known as catalysts for the polymerization of styrene-type compounds. Thus, for example, Ziegler and Kleiner in 1929 extensively investigated the use of these metals as catalysts for the polymerization of styrene (Ziegler & Kleiner, Ann. 473 57 (1929)).

The following examples will serve to illustrate the invention.

*Example 1*

A yellow sample of a crude light oil methyl styrene fraction, obtained by the fractionation of light oil from oil gas and containing 80.6% by weight of monomeric methyl styrenes, was polymerized by heating for a period of ten days at a temperature of 100° C. in a sealed glass vessel in an atmosphere of nitrogen. Residual unpolymerized material was removed by distillation under reduced pressure, resulting in the isolation of the polymethyl styrenes formed in a yield equivalent to 93.4% by weight of the methyl styrenes present in the original sample.

The polymethylstyrenes isolated had the following physical properties.

| | |
|---|---|
| Viscosity _____Centipoises__ | 13.2 |
| Color _____ | 4.0 |
| Toughness _____ | [1] 1.0 |

[1] Very brittle.

The viscosity, which may be regarded as a measure of the average molecular weight of the sample, was determined by measuring the viscosity of a 10% solution of the polymethyl styrene in toluene at a temperature of 25° C.

The color of the polymethyl styrenes was determined by comparing it with a set of Gardner color standards.

The toughness was measured by comparison with an arbitrary scale in which 1 represents a very brittle polymer and 5 represents a very tough polymer.

*Example 2*

A 270 gm. (300 cc.) portion of the same methyl styrene fraction used in Example 1 was placed in a 500 cc. round bottom flask after which 1.56 grams of sodium dissolved in 18 cc. of liquid ammonia was added with vigorous agitation. The ammonia vaporized immediately upon contacting the methyl styrene fraction resulting in the deposition of the sodium originally present in the liquid ammonia solution in the form of very finely divided particles in the methyl styrene fraction. The mixture was warmed to a temperature of 25° C. and the methyl styrene distilled under reduced pressure, the distillate being clear, sparkling, and water-white in color. Losses due to the removal of undesirable impurities, distillation, and handling amounted to 21 cc. or 7.0% by volume of the original sample.

A portion of the refined sample was polymerized in a manner similar to that described in Example 1.

The yield of polymethyl styrenes obtained was 92.3% by weight of the methyl styrenes present in the unpolymerized sample.

The polymethyl styrene isolated had the following physical properties:

| | |
|---|---|
| Viscosity _____Centipoises__ | 33.3 |
| Color _____ | 0.8 |
| Toughness _____ | [1] 5.0 |

[1] Very tough polymer.

As pointed out previously, finely divided metals in groups IA and IIA of the periodic table, namely, lithium, sodium, potassium, rubidium, caesium, barium, strontium, and calcium, or mixtures containing one or more of these materials may be used for refining impure methyl styrene fractions, particularly those obtained from light oil. Due to the availability and low cost of sodium and potassium, however, these metals are preferred for the use set forth herein.

Alloys of these metals also may be used, such as $NaPb_{10}$, $NaHg_4$, $NaCa_5$, $NaZn_{12}$, $KNa$, and the like. In general, the alloys of the respective metals react with the impurities present in crude methyl styrene fractions at a slower rate than the corresponding metals.

In general, therefore, it may be said that finely divided metals in groups IA and IIA of the periodic table, and their alloys, may be used to refine methyl styrene fractions.

Due consideration must be given to the fact that many of these metals, and alloys, are active catalysts for the polymerization of methyl styrene. Consequently, great care must be exercised in order to operate the process within well defined limits in order to effect the removal of the impurities present without polymerizing excessive quantities of the monomeric methyl styrene present in the crude fraction treated.

The most important of these reaction variables are (1) degree of subdivision of the treating agent, (2) concentration of the methyl styrene fraction treated, (3) quantity of sodium, or other reactive metal, or alloy, used (4) reaction temperature, (5) quantity and type of impurities present in the methyl styrene fraction, (6) method of applying the sodium, or other metal or alloy, to the methyl styrene fraction, (7) speed of agitation and (8) reaction time.

In view of the extreme difficulty in exactly delimiting each variable in the wide variety of possible combinations of the foregoing eight variables, resort will be had to an expression for reaction conditions which will be well understood by persons skilled in the art upon becoming familiar with this invention. It may be said that treating conditions should be such, having in mind what has been said with respect to the above variables, as to avoid a substantially large repolymerization of the methyl styrene under treatment. In other words, the methyl styrene is treated under reaction conditions insufficiently severe to polymerize a large part thereof during treatment.

Once knowing what the variables in treating conditions are and the effect of such variables, it is relatively simple for the person skilled in the art upon becoming familiar with this invention to control his reaction conditions to avoid unnecessary polymerization of the methyl styrene undergoing treatment.

Undoubtedly, the most important of these reaction variables is the degree of subdivision of the treating agent. As pointed out previously, satisfactory results are obtained only when the treating agent is finely divided which term includes a dispersion or a solution in a suitable solvent. While it is difficult to assign a definite size above which it may be said that the respective metals are inefficient, it has been found that when the degree of subdivision is such that the major portion of the powdered metal is comprised of particles smaller than $\frac{1}{32}''$ in any diameter, excellent results are obtained.

Almost any desired method may be employed in the preparation of such finely divided metals. Thus, metallic sodium may be (1) dispersed in hot xylene, paraffin, or other inert organic material with vigorous agitation, (2) sprayed through suitable orifices or nozzles, (3) extruded through very fine orifices, (4) dissolved in a solvent such as liquid ammonia, followed by the volatilization of the ammonia, or (5) an arc may be generated between sodium electrodes in an inert liquid.

Methyl styrene fractions or solutions containing from 1% to 99.9% monomeric methyl styrene may be treated by the method described herein to produce water-white refined fractions possessing only traces, or none, of undesired impurities, such as methyl phenylacetylene, color, and color-forming bodies. Fractions containing at least 30% methyl styrene are preferred, particularly when the monomer is to be converted into polymethylstyrene. For this purpose, a methyl styrene fraction of at least 50% concentration is particularly preferred. While the boiling range of extremely dilute methyl styrene fractions may cover a fairly wide range, boiling ranges between approximately 160° to 180° C. and more especially between approximately 165° and 175° C. are preferred. Narrower fractions such as between approximately 167° C. and 173° C. are particularly desirable. Extremely dilute fractions may be employed in some instances, such as when it is desired to react methyl styrene with some other compound, in which case my treatment serves to purify such methyl styrene for reaction purposes. Certain precautions, however, should be observed, particularly in the case of methyl styrene fractions containing high concentrations of monomeric methyl styrene. As the methyl styrene present in fractions containing high concentrations of monomeric methyl styrene has a pronounced tendency to polymerize in the presence of sodium, or certain of the other treating agents, or alloys, particularly when such materials are in very finely-divided form, certain precautions with respect to reaction temperature and time should be observed with such fractions in order to prevent undue polymerization thereof, as will be more particularly described hereinafter.

The desired quantity of sodium or other reactive metal or alloy for the removal of undesired impurities from methyl styrene fractions will vary considerably with the concentration of the fraction and the type and concentration of the impurities present. Thus, in fairly dilute fractions it will be found that from two to five times the theoretical quantity of sodium to react with the methyl phenylacetylene present usually will be sufficient to refine the sample to the desired extent. In the case of very concentrated fractions, however, such as those containing 98–99.9% methyl styrene, this ratio may be increased to 30 or even 80 times the quantity required to react with the methyl phenylacetylene present.

The reaction temperature may vary from very low temperatures, such as −33° C. and lower which is the boiling point of ammonia up to moderately high temperatures, such as 60° C. However, a safe upper limit to preclude excessive polymerization of methyl styrene is 50° C., and this is preferably reduced to 30° C. in the case of very concentrated methyl styrene fractions.

The desired quantity of sodium or other active metal to be used to refine a given methyl styrene fraction is determined in large measure by the type and quantity of impurities present. In most cases, however, the quantity of methyl phenylacetylene found in a given sample may be taken as a measure of the total impurities present. As pointed out previously, the amount of sodium to be used may be varied such as from two to eighty times the quantity required to remove the methyl phenylacetylene, the exact amount preferably used being dependent largely upon the concentration of methyl styrene in the fraction.

The method of applying the active metal has a considerable influence upon the rapidity with which the impurities are removed. Thus, the use of a solution of sodium in liquid ammonia will be found to almost instantaneously remove the mentioned impurities from a given methyl styrene fraction due to the moleculer dimensions of the individual sodium particles and to the intimate contact between the two phases. The addition of metallic sodium to an emulsion of methyl styrene in liquid ammonia produced for example by rapid agitation of the two components also is particularly effective.

The speed of agitation has a very profound bearing upon the rate of removal of impurities from methyl styrene. In general, it may be said that the rate of removal of such impurities varies directly with the speed of agitation employed.

The time of reaction is an important variable in the removal of impurities from methyl styrene. As pointed out previously, many of the treating agents described are good catalysts for the polymerization of monomeric methyl styrene. Consequently, care should be exercised not to exceed certain definite reaction periods in order to prevent any undue loss of methyl styrene in the form of polymethylstyrene.

Generally speaking, it may be said that the time of reaction may vary from a few seconds to several hours, depending mainly upon the concentration of the methyl styrene fraction being treated and the reaction temperature. Thus, with very dilute methyl styrene fractions, say 30–50% contentration, and relatively low reaction temperatures, say 25° C., a reaction time of from three to seven hours normally may be employed without undue loss of methyl styrene.

With highly concentrated methyl styrene fractions, say from 98 to 99.9% concentration, and fairly low reaction temperatures, say from 0 to 20° C., reaction times ranging from several seconds to one hour may be employed.

An increase in the reaction temperature employed in the foregoing illustrations is preferably met with a corresponding reduction in the reaction time in order to prevent excessive polymerization.

The prevention of excessive polymerization also prevents excessive reduction of the methyl styrene to methyl ethyl benzene in the case of those metals which are capable of causing reduction for example when in solution in ammonia.

It is well known that methyl phenyl acetylene, mentioned above as a principal impurity, is an acetylenic compound having a hydrogen atom attached to a carbon atom of a triple bond.

In the specification and in the claims the following terms have the following meanings.

The term "alkali metal" as used in the claims is intended to mean a metal of the group consisting of lithium, sodium, potassium, rubidium and caesium.

The term "finely divided" is intended to mean a material reduced to such a state of fineness that the preponderating part is composed of particles having a diameter of less than $\frac{1}{32}''$, as well as materials in the colloidal or dissolved form.

While reagents and procedures of a particular nature have been specifically described, it is to be understood that these are by way of illustration. Therefore, changes, omissions, additions, substitutions, and/or modifications might be made within the scope of the claims without departing from the spirit of the invention.

I claim:

1. A process for purifying methyl styrene contained in a mixture including methyl phenyl acetylene which comprises commingling said mixture with at least one finely divided material selected from the group consisting of metals of groups IA and IIA of the periodic system under conditions insufficiently drastic to polymerize the preponderant part of said methyl styrene, and recovering methyl styrene from the resulting mass less contaminated with said methyl phenyl acetylene.

2. A process for purifying methyl styrene contained in a mixture which also contains at least one acetylenic compound having a hydrogen atom attached to a carbon atom of a triple bond comprising commingling with said mixture a finely divided material selected from the group consisting of metals and alloys of metals of groups IA and IIA of the periodic system under conditions insufficiently drastic to polymerize the preponderant part of said methyl styrene, and separating methyl styrene in purified form from the resulting mass.

3. A process for purifying a light oil methyl styrene fraction containing other material in addition to methyl styrene which comprises contacting said fraction with at least one finely divided material selected from the group consisting of metals and alloys of metals of groups IA and IIA of the periodic system under conditions insufficiently drastic to polymerize the preponderant part of the methyl styrene contained in said light oil fraction, and recovering methyl styrene from the resulting mass less contaminated with said other material.

4. A process for purifying methyl styrene contained in a mixture which also contains at least one acetylenic compound having a hydrogen atom attached to a carbon atom of a triple bond which comprises contacting said mixture with a solution in liquid ammonia of a metal selected from the group consisting of the metals of groups IA and IIA of the periodic system under conditions insufficiently drastic to polymerize the preponderant part of said methyl styrene, and separating methyl styrene in purified form from the resulting mass.

5. A process for purifying a light oil methyl styrene fraction containing other material in addition to methyl styrene which comprises mixing said fraction with a solution in liquid ammonia of a metal selected from the group consisting of metals of groups IA and IIA of the periodic system under conditions insufficiently drastic to polymerize the preponderant part of the methyl styrene contained in said light oil fraction, said conditions being such as to vaporize said ammonia and deposit said metal in said fraction in finely divided particles, and separating methyl styrene in purified form from the resulting mass.

6. A process for purifying methyl styrene contained in a mixture which also contains at least one acetylenic compound having a hydrogen atom attached to a carbon atom of a triple bond which comprises contacting said mixture with a solution in liquid ammonia of a metal selected from the group consisting of the metals of groups IA and IIA of the periodic system under conditions insufficiently drastic to polymerize the preponderant part of said methyl styrene, said conditions including temperature conditions between —33° C. and 60° C. being such as to vaporize said ammonia and deposit said metal in finely divided form, and separating methyl styrene in purified form from the resulting mass.

7. A process for purifying methyl styrene contained in a mixture which also contains an acetylenic compound having a hydrogen atom attached to a carbon atom of a triple bond, an aldehyde and indene comprising commingling with said mixture a finely divided material selected from the group consisting of metals of groups IA and IIA of the periodic system under conditions insufficiently drastic to polymerize the preponderant part of said methyl styrene, and separating methyl styrene in purified form from the resulting mass.

8. A process for purifying methyl styrene contained in a mixture which also contains an aldehyde comprising commingling with said mixture a finely divided material selected from the group consisting of metals of groups IA and IIA of the periodic system under conditions insufficiently drastic to polymerize the preponderant part of said methyl styrene, and separating methyl styrene in purified form from the resulting mass.

9. A process for purifying methyl styrene contained in a mixture which also contains at least one acetylenic compound having a hydrogen atom attached to a carbon atom of a triple bond comprising commingling with said mixture finely divided sodium under conditions insufficiently drastic to polymerize the preponderant part of said methyl styrene, and separating methyl styrene in purified form from the resulting mass.

10. A process for purifying methyl styrene contained in a mixture which also contains at least one acetylenic compound having a hydrogen atom attached to a carbon atom of a triple bond comprising commingling with said mixture finely divided potassium under conditions insufficiently drastic to polymerize the preponderant part of said methyl styrene, and separating methyl styrene in purified form from the resulting mass.

11. A process for purifying a light oil methyl styrene fraction containing other material in addition to methyl styrene which comprises mixing said fraction with finely divided sodium under conditions insufficiently drastic to polymerize the preponderant part of the methyl styrene contained in said light oil fraction, and separating purified methyl styrene from the resulting mass.

12. A process for purifying methyl styrene contained in a mixture which also contains at least one acetylenic compound having a hydrogen atom attached to a carbon atom of a triple bond which comprises contacting said mixture at atmospheric pressure with a solution in liquid ammonia of a metal selected from the group consisting oi the metals of groups IA and IIA of the periodic system under conditions insufficiently drastic to polymerize the preponderant part of said methyl styrene, and separating methyl styrene in purified form from the resulting mass.

13. A process for purifying a light oil methyl styrene fraction containing other material in addition to methyl styrene which comprises contacting said fraction with a finely divided alkali metal under conditions insufficiently drastic to polymerize the preponderant part of the methyl styrene contained in said light oil fraction, and recovering methyl styrene from the resulting mass less contaminated with said other material.

14. A process for purifying methyl styrene contained in a mixture which also contains indene comprising commingling with said mixture a finely divided material selected from the group consisting of metals of groups IA and IIA of the periodic system under conditions insufficiently drastic to polymerize the preponderant part of said methyl styrene, and separating methyl styrene in purified form from the resulting mass.

CLAUDE W. JORDAN.